US010500633B2

(12) United States Patent
Propheter-Hinckley et al.

(10) Patent No.: US 10,500,633 B2
(45) Date of Patent: Dec. 10, 2019

(54) GAS TURBINE ENGINE AIRFOIL IMPINGEMENT COOLING

(71) Applicant: United Technologies Corporation, Hartford, CT (US)

(72) Inventors: Tracy A. Propheter-Hinckley, Manchester, CT (US); Mark F. Zelesky, Bolton, CT (US); Dominic J. Mongillo, Jr., West Hartford, CT (US); Matthew A. Devore, Rocky Hill, CT (US); Steven Bruce Gautschi, Naugatuck, CT (US); Benjamin T. Fisk, East Granby, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 981 days.

(21) Appl. No.: 14/883,060

(22) Filed: Oct. 14, 2015

(65) Prior Publication Data
US 2016/0032416 A1 Feb. 4, 2016

Related U.S. Application Data

(62) Division of application No. 13/454,197, filed on Apr. 24, 2012, now Pat. No. 9,296,039.

(51) Int. Cl.
*B22C 9/04* (2006.01)
*B22C 9/10* (2006.01)
(Continued)

(52) U.S. Cl.
CPC .............. *B22C 9/04* (2013.01); *B22C 9/10* (2013.01); *B22C 9/24* (2013.01); *B22F 3/105* (2013.01);
(Continued)

(58) Field of Classification Search
CPC .......... B23P 15/02; F05D 22/30; F05D 22/31; B22F 5/04
See application file for complete search history.

(56) References Cited

U.S. PATENT DOCUMENTS

| 2,343,918 A | 5/1943 | McCoy |
| 4,248,094 A | 2/1981 | Thompson et al. |

(Continued)

FOREIGN PATENT DOCUMENTS

| CN | 101780544 | 7/2010 |
| EP | 0968776 | 1/2000 |

(Continued)

OTHER PUBLICATIONS

Extended European Search Report for European Application No. 13781545.2, dated Jun. 22, 2016.
(Continued)

*Primary Examiner* — David P Bryant
*Assistant Examiner* — Nirvana Deonauth
(74) *Attorney, Agent, or Firm* — Carlson, Gaskey & Olds, P.C.

(57) ABSTRACT

A method of manufacturing an airfoil includes the steps of depositing multiple layers of powdered metal onto one another. The layers are joined to one another with reference to CAD data relating to a particular cross-section of an airfoil. The airfoil is produced with leading and trailing edges joined by spaced apart pressure and suction sides to provide an exterior airfoil surface. An exterior wall provides the exterior airfoil surface at the leading edge. An impingement wall is integrally formed with the exterior wall to provide an impingement cavity between the exterior wall and the impingement wall. Multiple impingement holes are provided in the impingement wall. The impingement holes are spaced laterally across the impingement wall.

16 Claims, 6 Drawing Sheets

(51) Int. Cl.
*B22F 5/04* (2006.01)
*F01D 5/18* (2006.01)
*B22F 3/105* (2006.01)
*B22F 3/10* (2006.01)
*B23K 15/00* (2006.01)
*C21D 9/00* (2006.01)
*B22C 9/24* (2006.01)
*B33Y 10/00* (2015.01)
*B33Y 80/00* (2015.01)

(52) U.S. Cl.
CPC .......... *B22F 3/1017* (2013.01); *B22F 3/1055* (2013.01); *B22F 5/04* (2013.01); *B23K 15/0086* (2013.01); *C21D 9/0068* (2013.01); *F01D 5/187* (2013.01); *B33Y 10/00* (2014.12); *B33Y 80/00* (2014.12); *F05D 2240/303* (2013.01); *F05D 2260/201* (2013.01); *F05D 2260/202* (2013.01); *F05D 2260/205* (2013.01); *Y02P 10/292* (2015.11); *Y02P 10/295* (2015.11)

(56) References Cited

U.S. PATENT DOCUMENTS

| | | |
|---|---|---|
| 4,490,649 A | 12/1984 | Wang |
| 4,596,917 A | 6/1986 | Nied et al. |
| 4,738,587 A | 4/1988 | Kildea |
| 4,815,939 A | 3/1989 | Doble |
| 5,038,014 A | 8/1991 | Pratt et al. |
| 5,060,914 A | 10/1991 | Wang et al. |
| 5,164,097 A | 11/1992 | Wang et al. |
| 5,165,860 A | 11/1992 | Stoner et al. |
| 5,246,340 A | 9/1993 | Winstanley et al. |
| 5,271,715 A | 12/1993 | Zelesky et al. |
| 5,314,000 A | 5/1994 | Wang et al. |
| 5,486,093 A | 1/1996 | Auxier et al. |
| 5,558,497 A | 9/1996 | Kraft et al. |
| 5,608,637 A | 3/1997 | Wang et al. |
| 5,740,074 A | 4/1998 | Wang et al. |
| 5,837,960 A | 11/1998 | Lewis et al. |
| 5,926,393 A | 7/1999 | Wang et al. |
| 5,939,006 A | 8/1999 | Wang et al. |
| 6,126,741 A | 10/2000 | Jones et al. |
| 6,142,734 A | 11/2000 | Lee |
| 6,183,198 B1 | 2/2001 | Manning et al. |
| 6,200,439 B1 | 3/2001 | Wei et al. |
| 6,238,183 B1 * | 5/2001 | Williamson ............ F01D 5/189 416/96 A |
| 6,246,918 B1 | 6/2001 | Wang et al. |
| 6,256,597 B1 | 7/2001 | Wang et al. |
| 6,264,822 B1 | 7/2001 | Wei et al. |
| 6,267,868 B1 | 7/2001 | Wei et al. |
| 6,290,461 B1 | 9/2001 | Wei et al. |
| 6,379,528 B1 | 4/2002 | Lee et al. |
| 6,387,242 B1 | 5/2002 | Wei et al. |
| 6,391,251 B1 | 5/2002 | Keicher et al. |
| 6,416,283 B1 | 7/2002 | Johnson et al. |
| 6,505,673 B1 | 1/2003 | Abuaf et al. |
| 6,554,571 B1 | 4/2003 | Lee et al. |
| 6,634,859 B2 | 10/2003 | Weigand et al. |
| 6,669,447 B2 | 12/2003 | Beattie |
| 6,691,019 B2 | 2/2004 | Seeley et al. |
| 6,743,350 B2 | 6/2004 | Lee et al. |
| 6,773,230 B2 | 8/2004 | Bather et al. |
| 6,850,810 B1 | 2/2005 | Wang et al. |
| 6,981,846 B2 | 1/2006 | Liang |
| 6,998,753 B2 | 2/2006 | Irwin et al. |
| 7,010,474 B1 | 3/2006 | Wang et al. |
| 7,011,502 B2 | 3/2006 | Lee et al. |
| 7,014,424 B2 | 3/2006 | Cunha |
| 7,026,554 B2 | 4/2006 | Lee et al. |
| 7,029,232 B2 | 4/2006 | Tuffs et al. |
| 7,112,044 B2 | 9/2006 | Whitehead et al. |
| 7,121,800 B2 | 10/2006 | Beattie |
| 7,121,801 B2 | 10/2006 | Surace et al. |
| 7,125,225 B2 | 10/2006 | Surace et al. |
| 7,137,776 B2 | 11/2006 | Draper et al. |
| 7,144,220 B2 | 12/2006 | Marcin, Jr. |
| 7,217,093 B2 | 5/2007 | Propheter et al. |
| 7,270,517 B2 | 9/2007 | Garner |
| 7,306,026 B2 | 12/2007 | Memmen |
| 7,395,593 B2 | 7/2008 | Wang et al. |
| 7,413,001 B2 | 8/2008 | Wang et al. |
| 7,478,994 B2 | 1/2009 | Cunha et al. |
| 7,487,819 B2 | 2/2009 | Wang et al. |
| 7,520,725 B1 | 4/2009 | Liang |
| 7,556,476 B1 | 7/2009 | Liang |
| 7,624,787 B2 | 12/2009 | Lee et al. |
| 7,686,065 B2 | 3/2010 | Luczak |
| 7,686,582 B2 | 3/2010 | Cunha |
| 7,690,893 B2 | 4/2010 | Cunha |
| 7,695,582 B2 | 4/2010 | Stowell et al. |
| 7,699,583 B2 | 4/2010 | Cunha |
| 7,717,675 B1 | 5/2010 | Liang |
| 7,722,916 B2 | 5/2010 | Wang et al. |
| 7,832,081 B2 | 11/2010 | Wang et al. |
| 7,857,588 B2 | 12/2010 | Propheter-Hinckley et al. |
| 7,919,151 B2 | 4/2011 | Deng et al. |
| 7,938,168 B2 | 5/2011 | Lee et al. |
| 7,946,815 B2 | 5/2011 | Liang |
| 7,988,418 B2 | 8/2011 | Cunha et al. |
| 8,109,725 B2 | 2/2012 | Abdel-Messeh et al. |
| 8,109,735 B2 | 2/2012 | Gage et al. |
| 8,231,349 B2 | 7/2012 | Naik et al. |
| 8,523,523 B2 | 9/2013 | Townes et al. |
| 8,657,576 B2 | 2/2014 | Tibbott et al. |
| 2003/0120415 A1 | 6/2003 | Seeley et al. |
| 2003/0173213 A1 | 9/2003 | Lee et al. |
| 2004/0076519 A1 | 4/2004 | Halfmann et al. |
| 2004/0263020 A1 | 12/2004 | Irwin et al. |
| 2004/0263021 A1 | 12/2004 | Irwin et al. |
| 2005/0006047 A1 | 1/2005 | Wang et al. |
| 2005/0012424 A1 | 1/2005 | Irwin et al. |
| 2005/0035501 A1 | 2/2005 | Chikugo |
| 2005/0072592 A1 | 4/2005 | Lee et al. |
| 2005/0111977 A1 | 5/2005 | Lee et al. |
| 2005/0204543 A1 | 9/2005 | Wang et al. |
| 2005/0205232 A1 | 9/2005 | Wang et al. |
| 2006/0002795 A1 * | 1/2006 | Liang ..................... F01D 5/187 416/97 R |
| 2006/0021730 A1 | 2/2006 | Marcin, Jr. |
| 2006/0090871 A1 | 5/2006 | Snyder et al. |
| 2006/0093480 A1 | 5/2006 | Cunha et al. |
| 2006/0107668 A1 | 5/2006 | Cunha et al. |
| 2006/0266285 A1 | 11/2006 | Fernihough et al. |
| 2006/0273075 A1 | 12/2006 | Paauwe et al. |
| 2007/0059171 A1 | 3/2007 | Simms et al. |
| 2007/0201980 A1 | 8/2007 | Morris et al. |
| 2007/0281074 A1 | 12/2007 | Wang et al. |
| 2007/0284411 A1 | 12/2007 | Luczak |
| 2007/0285198 A1 | 12/2007 | Farquhar et al. |
| 2008/0135202 A1 | 6/2008 | Lee et al. |
| 2008/0135530 A1 | 6/2008 | Lee et al. |
| 2008/0135718 A1 | 6/2008 | Lee et al. |
| 2008/0135721 A1 | 6/2008 | Wang et al. |
| 2008/0135722 A1 | 6/2008 | Wang et al. |
| 2008/0190582 A1 | 8/2008 | Lee et al. |
| 2008/0216303 A1 | 9/2008 | Wang et al. |
| 2008/0240919 A1 | 10/2008 | Liang |
| 2008/0290215 A1 | 11/2008 | Udall et al. |
| 2009/0047136 A1 | 2/2009 | Chon et al. |
| 2009/0208325 A1 | 8/2009 | Devore et al. |
| 2009/0229780 A1 | 9/2009 | Skelley |
| 2009/0238695 A1 | 9/2009 | Devore et al. |
| 2009/0258168 A1 | 10/2009 | Barcock |
| 2009/0304497 A1 | 12/2009 | Meier et al. |
| 2009/0317258 A1 | 12/2009 | Tibbott et al. |
| 2010/0025001 A1 | 2/2010 | Lee et al. |
| 2010/0034647 A1 | 2/2010 | Lee et al. |
| 2010/0232946 A1 | 9/2010 | Propheter-Hinckley et al. |
| 2010/0303635 A1 | 12/2010 | Townes et al. |
| 2010/0310367 A1 | 12/2010 | Devore et al. |

(56) References Cited

U.S. PATENT DOCUMENTS

| | | |
|---|---|---|
| 2011/0048664 A1 | 3/2011 | Kush et al. |
| 2011/0123310 A1 | 5/2011 | Beattie et al. |
| 2011/0123311 A1 | 5/2011 | Devore et al. |
| 2011/0135952 A1 | 6/2011 | Morris |
| 2011/0274559 A1 | 11/2011 | Jenne et al. |
| 2011/0286857 A1 | 11/2011 | Gleiner et al. |
| 2011/0293434 A1 | 12/2011 | Lee et al. |
| 2013/0195673 A1* | 8/2013 | Godfrey ............ B23P 15/04 416/241 R |
| 2013/0209262 A1* | 8/2013 | Matejczyk ......... F04D 29/324 416/223 R |
| 2013/0280091 A1 | 10/2013 | Propheter-Hinckley et al. |
| 2015/0004001 A1 | 1/2015 | Schnieder et al. |

FOREIGN PATENT DOCUMENTS

| | | |
|---|---|---|
| EP | 1975372 | 10/2001 |
| EP | 1 365 108 | 11/2003 |
| EP | 1772210 | 4/2007 |
| EP | 1995411 A2 | 11/2008 |
| EP | 2258925 A2 | 12/2010 |
| EP | 2551041 | 1/2013 |
| JP | 2002242607 | 8/2008 |
| RU | 1071031 | 10/1996 |

OTHER PUBLICATIONS

Direct Laser Freeform Fabrication of high performance metal components. Suman Das, Joseph J. Beaman, Martin Wohlert, David L. Bourell. Rapid Prototyping Journal. vol. 4, No. 3, 1998, pp. 112-117, XP002753000.

Rapid Prototyping and Tooling Techniques: A review of Applications for Rapid Investment Casting. Int J Adv Manuf Technol, vol. 25, 2005, XP002758519. D01: 10, 1007/s00170-003-1840-6.

International Search Report for PCT Application No. PCT/US2013/037387, dated Jul. 25, 2013.

International Preliminary Report on Patentability t for PCT Application No. PCT/US2013/037387, dated Nov. 6, 2014.

Z.L. Lu, et al., Fabricating the Stream Turbine Blade by Direct Laser Forming:, Materials and Manufacturing Processes, No. 26, 2011, pp. 879-885, XP-002752999.

Partial Supplementary European Search Report for European Application No. 13781545.2, dated Feb. 2, 2016.

* cited by examiner

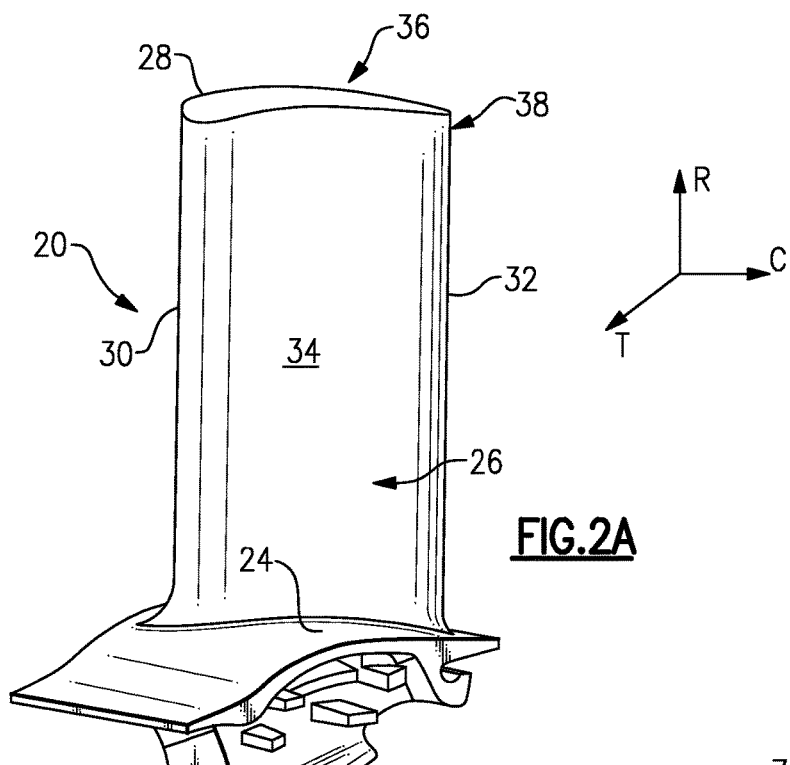
FIG.2A
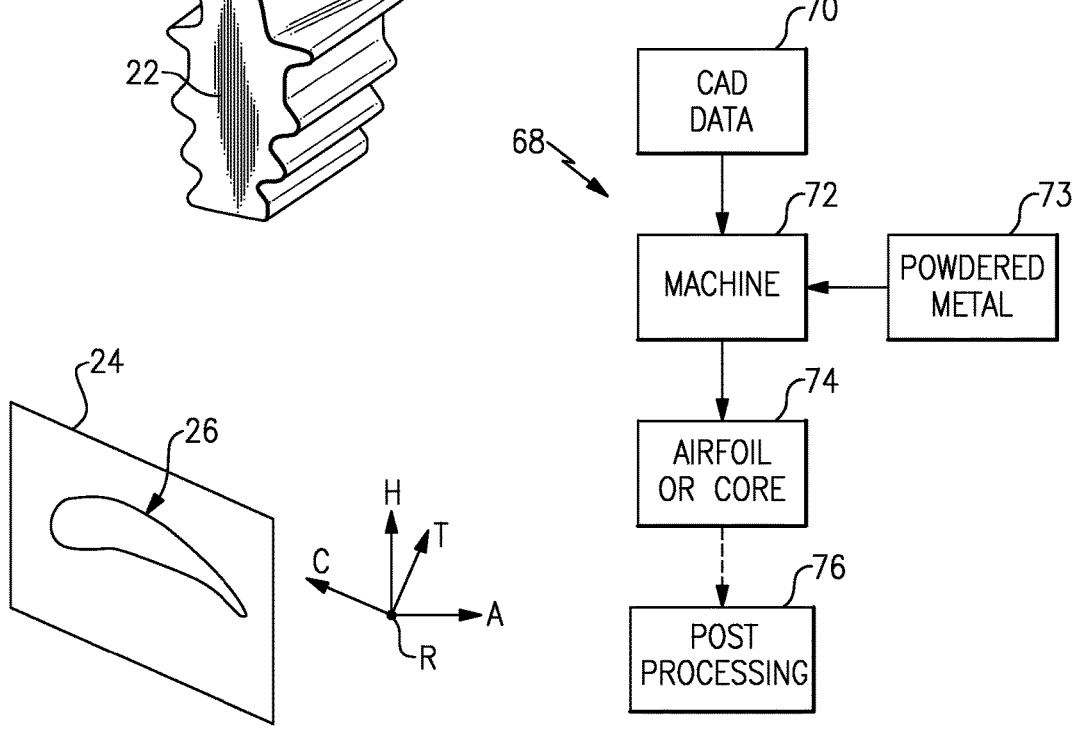
FIG.2B
FIG.9

GAS TURBINE ENGINE AIRFOIL IMPINGEMENT COOLING

CROSS-REFERENCE TO RELATED APPLICATIONS

This application in a divisional to U.S. application Ser. No. 13/454,197 which was filed on Apr. 24, 2012 and is incorporated herein by reference.

BACKGROUND

This disclosure relates to an airfoil for a gas turbine engine. In particular, the disclosure relates to an impingement cooling configuration for the airfoil.

Airfoils, particularly those used in a hot section of a gas turbine engine, incorporate internal cooling features. One type of configuration utilizes a radially extending cooling passage that communicates cooling fluid through holes in an impingement wall within the airfoil to impinge upon an interior surface of a leading edge wall. The leading edge wall provides the leading edge of the airfoil.

Current airfoil manufacturing techniques limit possible impingement cooling configurations. Typically, the airfoil is cast within a mold having at least first and second portions secured to one another to define an exterior airfoil surface. The core structure used to form the impingement holes and cooling passages must be retained between the mold portions, which limit the location and configuration of the impingement holes. Typically, the impingement wall can only be formed with a single row of holes extending in a radial direction and centered along an airfoil thickness direction.

SUMMARY

In one exemplary embodiment, a method of manufacturing an airfoil comprising the steps of depositing multiple layers of powdered metal onto one another, joining the layers to one another with reference to CAD data relating to a particular cross-section of an airfoil, and producing the airfoil with leading and trailing edges joined by spaced apart pressure and suction sides to provide an exterior airfoil surface. An exterior wall provides the exterior airfoil surface at the leading edge. An impingement wall is integrally formed with the exterior wall to provide an impingement cavity between the exterior wall and the impingement wall. Multiple impingement holes are provided in the impingement wall. The impingement holes are spaced laterally across the impingement wall.

In a further embodiment of any of the above, the method includes the step processing the airfoil to provide desired structural characteristics.

In a further embodiment of any of the above, the processing step includes heating the airfoil to reconfigure the joined layers into a single, crystalline structure.

In a further embodiment of any of the above, the impingement wall includes a surface from which a first leg extends outward. A second leg adjoins the first leg at an angle to provide a scoop that is arranged in a radially extending cooling passage with the second leg spaced from the surface. The impingement holes include an entrance that faces the cooling passage and an exit that faces the impingement cavity. The scoop is arranged at the entrance.

In a further embodiment of any of the above, the impingement holes are spaced laterally across the impingement wall along rows that extend in a radial direction.

In a further embodiment of any of the above, the impingement wall includes a generally uniform thickness.

In a further embodiment of any of the above, the exterior wall is a leading edge wall.

In a further embodiment of any of the above, the impingement wall includes an arcuate shape in an airfoil thickness direction.

In a further embodiment of any of the above, the arcuate shape extends toward the leading edge.

In a further embodiment of any of the above, the arcuate shape extends away from the leading edge.

In a further embodiment of any of the above, the impingement holes are spaced laterally across the impingement wall along rows that extend in a radial direction.

In a further embodiment of any of the above, the impingement holes include an entrance that faces a radially extending cooling passage and extends to an exit that faces the impingement cavity. The entrance and exit have different shapes.

In a further embodiment of any of the above, the entrance is generally circular. The exit is elongated and has a width that is substantially greater than a height.

In a further embodiment of any of the above, the width is oriented in a radial direction or at an angle from the radial direction.

In a further embodiment of any of the above, the impingement wall includes first and second legs that adjoin one another at an angle to provide a scoop arranged in a radially extending cooling passage. The impingement holes include an entrance that faces the cooling passage and an exit that faces the impingement cavity. The scoop is arranged at the entrance.

In a further embodiment of any of the above, a film cooling hole is in the airfoil exterior surface and is fluidly connected to the impingement cavity.

In a further embodiment of any of the above, the film cooling holes are arranged in gill rows on at least one of a pressure side and a suction side of the exterior wall.

In a further embodiment of any of the above, the exterior wall is a pressure side wall.

In another exemplary embodiment, a method of manufacturing a core for an airfoil comprising the steps of depositing multiple layers of powdered metal onto one another, joining the layers to one another with reference to CAD data relating to a particular cross-section of a core, and producing the core with a first structure corresponding to a cooling passage. A second structure corresponds to an impingement cavity and columns interconnect the first and second structures. The columns correspond to multiple impingement cooling holes. The first and second structures and the columns are integrally formed.

In a further embodiment of any of the above, the method includes the step of casting wax about the core in the shape of an airfoil contour.

BRIEF DESCRIPTION OF THE DRAWINGS

The disclosure can be further understood by reference to the following detailed description when considered in connection with the accompanying drawings wherein:

FIG. 2A is a perspective view of the airfoil having the disclosed cooling passage.

FIG. 2B is a plan view of the airfoil illustrating directional references.

FIG. 9 is a flow chart depicting an example airfoil manufacturing process.

DETAILED DESCRIPTION

Figure 1:
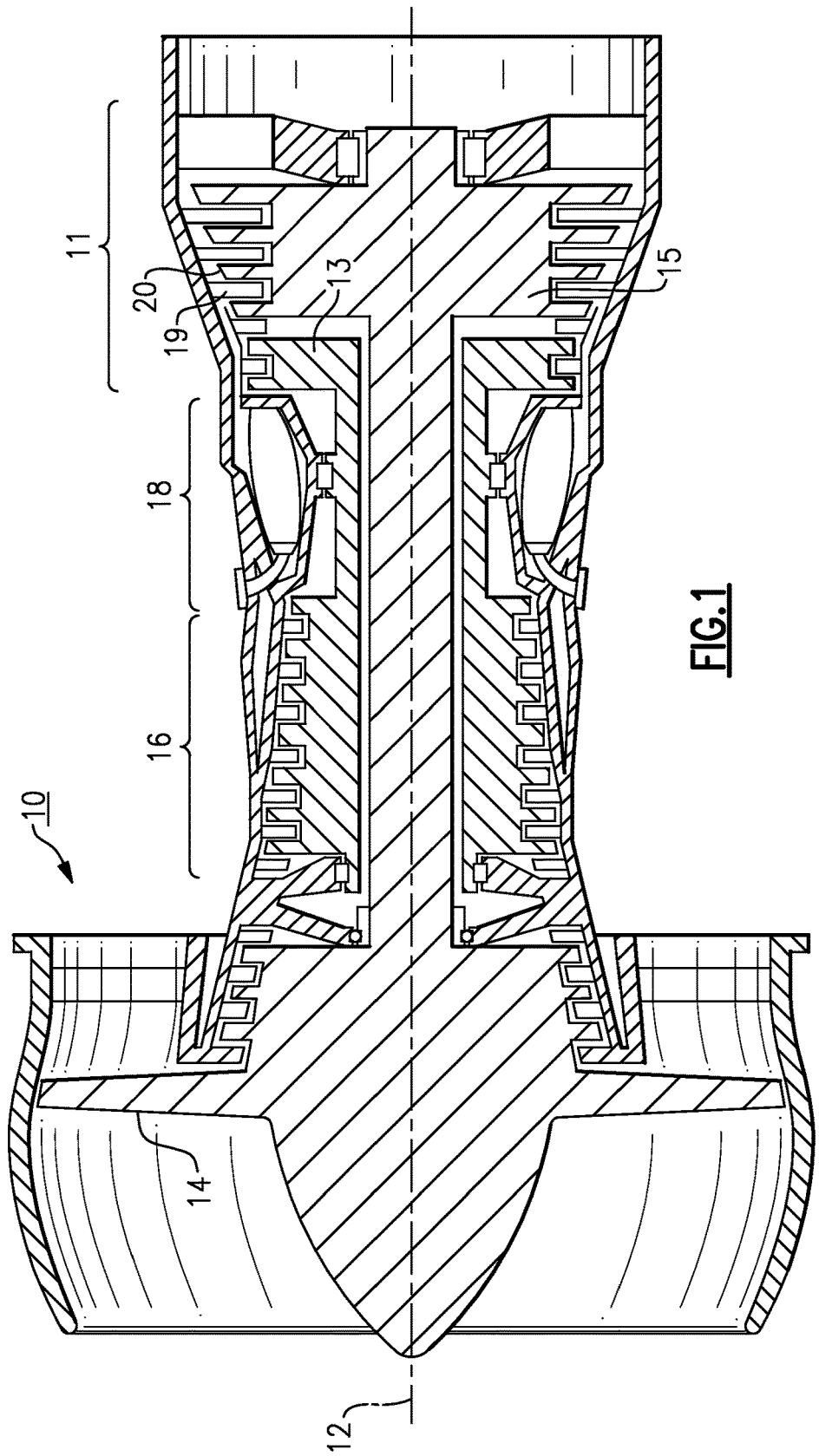
FIG. 1 is a schematic view of a gas turbine engine incorporating the disclosed airfoil.

FIG. 1 schematically illustrates a gas turbine engine 10 that includes a fan 14, a compressor section 16, a combustion section 18 and a turbine section 11, which are disposed about a central axis 12. As known in the art, air compressed in the compressor section 16 is mixed with fuel that is burned in combustion section 18 and expanded in the turbine section 11. The turbine section 11 includes, for example, rotors 13 and 15 that, in response to expansion of the burned fuel, rotate, which drives the compressor section 16 and fan 14.

The turbine section 11 includes alternating rows of blades 20 and static airfoils or vanes 19. It should be understood that FIG. 1 is for illustrative purposes only and is in no way intended as a limitation on this disclosure or its application.

An example blade 20 is shown in FIG. 2A. The blade 20 includes a platform 24 supported by a root 22, which is secured to a rotor, for example. An airfoil 26 extends radially outwardly from the platform 24 opposite the root 22 to a tip 28. While the airfoil 26 is disclosed as being part of a turbine blade 20, it should be understood that the disclosed airfoil can also be used as a vane.

Referring to FIG. 2B, the airfoil 26 includes an exterior airfoil surface 38 extending in a chord-wise direction C from a leading edge 30 to a trailing edge 32. The airfoil 26 is provided between pressure and suction sides 34, 36 in an airfoil thickness direction T, which is generally perpendicular to the chord-wise direction C. Multiple airfoils 26 are arranged circumferentially in a circumferential direction H. The airfoil 26 extends from the platform 24 in a radial direction R to the tip 28. The exterior airfoil surface 38 may include multiple film cooling holes.

Figure 3C:
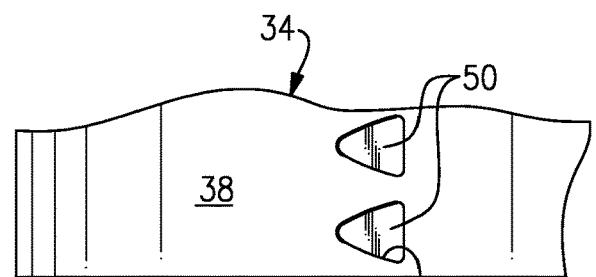
FIG. 3C is a side elevational view of the airfoil shown in FIG. 3A.
Figure 3A:
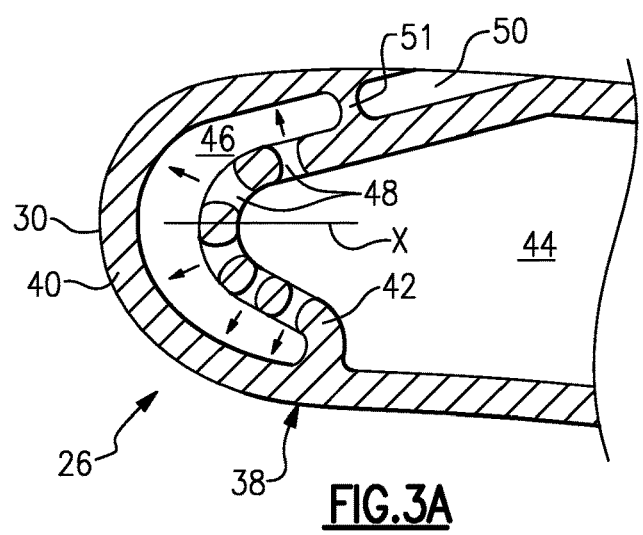
FIG. 3A is a partial cross-sectional view of an example airfoil taken along the section line of FIG. 2.
Figure 3B:
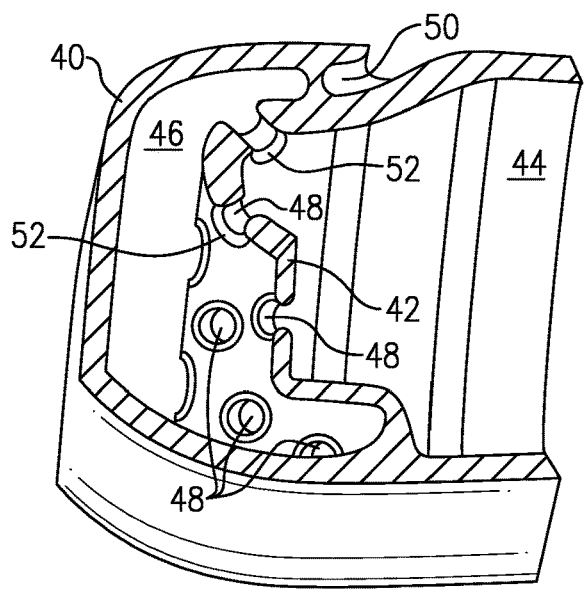
FIG. 3B is a perspective view of the airfoil shown in FIG. 3A.
Figure 4A:
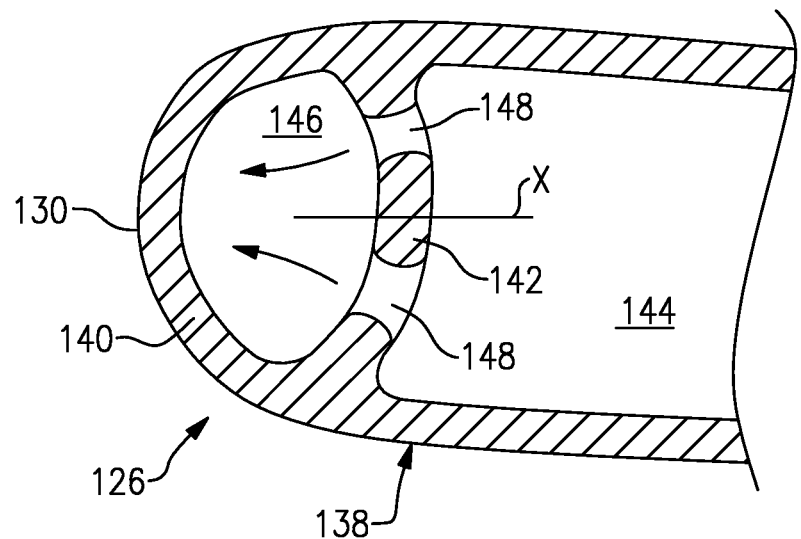
FIG. 4A is a partial cross-sectional view of an example airfoil taken along the section line of FIG. 2.
Figure 4B:
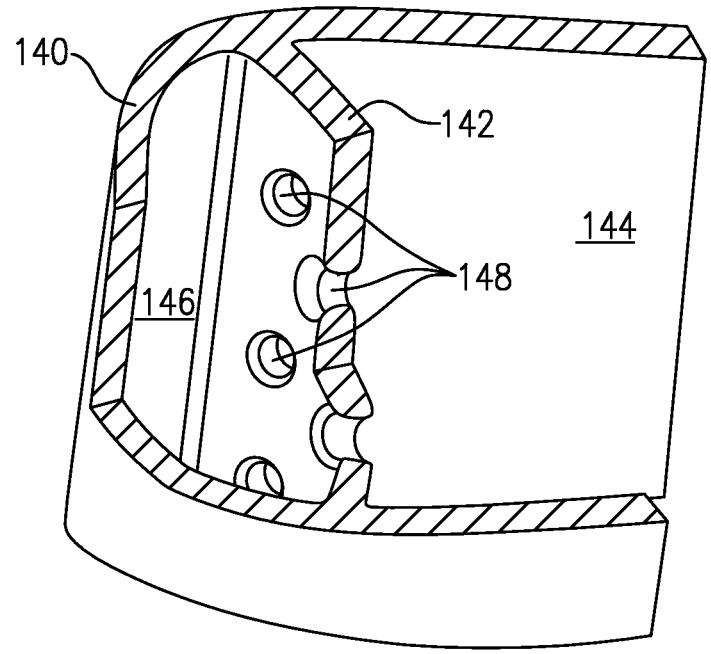
FIG. 4B is a perspective view of the airfoil shown in FIG. 4A.

Referring to FIGS. 3A-3C, the airfoil 26 provides a body including a leading edge wall 40 providing the exterior airfoil surface 38 at the leading edge 30. An impingement wall 42 is integrally formed with the leading edge wall 40 to provide an impingement cavity 46 between the leading edge wall 40 and the impingement wall 42. That is, the impingement wall 42 is not provided by a separate, discrete structure or insert. A cooling passage 44 is provided on a side of the impingement wall 42 opposite the impingement cavity 46 to carry cooling fluid, such as bleed air from a compressor stage. Multiple impingement holes 48 are provided in the impingement wall 42 to direct the cooling fluid onto an interior surface of the leading edge wall 40. The impingement holes 48 are spaced laterally across the impingement wall 42. That is, the impingement holes 48 need not be located at the parting line X of a mold relative to the airfoil thickness direction T.

In one example, the impingement wall 42 includes an arcuate shape in an airfoil thickness direction T, as illustrated in FIGS. 3A-4B. In the example shown in FIG. 3A, the arcuate shape extends toward the leading edge wall 40. In the example airfoil 126 shown in FIGS. 4A and 4B, the arcuate shape extends away from the leading edge wall 140. The airfoil 126 includes an exterior airfoil surface 138. Cooling fluid is communicated from the cooling passage 144 through the impingement holes 148 into the impingement cavity 146 and onto the leading edge wall 140, which provides the leading edge 130. The impingement holes 148 are laterally offset relative to the parting line X.

Figure 5C:
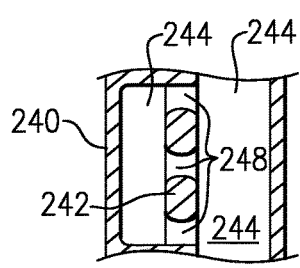
FIG. 5C is a cross-sectional view of the airfoil shown in FIG. 5B taken along line X.
Figure 5B:
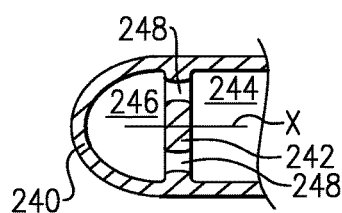
FIG. 5B is a cross-sectional view of the airfoil shown in FIG. 5A taken along the section line shown in FIG. 2.
Figure 5A:
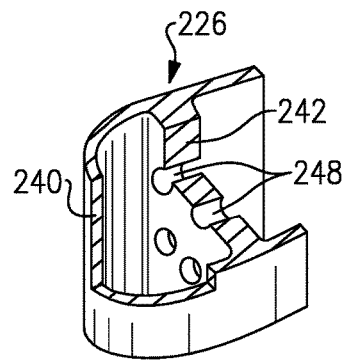
FIG. 5A is a perspective view of another example airfoil.

In the example airfoil 226 shown in FIGS. 5A-5C, the impingement wall 242 is generally flat. Cooling fluid is communicated from the cooling passage 244 through the impingement holes 248 into the impingement cavity 246 and onto the leading edge wall 240. The impingement holes 248 are laterally offset relative to the parting line X.

In this manner, the shape of the impingement wall can be shaped to direct the impingement flow at the leading edge wall 40, 140, 240 in a desired manner with the impingement holes 48, 148, 248 normal to a tangent of the impingement wall 42, 142, 242, for example.

Returning to FIGS. 3A and 3B, for example, the impingement wall 42 includes a generally uniform thickness. That is, portions of the impingement wall 42 need not be made thicker to accommodate the laterally offset impingement holes 48. The impingement holes 48 may include radii 52 at their entrances and/or exits. The impingement holes 48 are spaced laterally across the impingement wall 42 in rows, for example, extending in a radial direction. The rows may be offset relative to one another radially to provide a more compact cluster of impingement holes 48.

With continuing reference to FIGS. 3A & 3C, pedestals 51 (protrusions) may also be provided on the impingement wall 42 to enhance cooling. Film cooling holes 50 having a tear drop shape 53 arranged in gill rows may be provided in the exterior airfoil surface 38 and arranged in fluid communication with the impingement cavity 46.

Figure 6C:
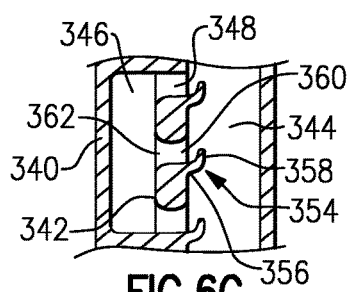
FIG. 6C is a cross-sectional view of the airfoil shown in FIG. 5B taken along line X.
Figure 6B:
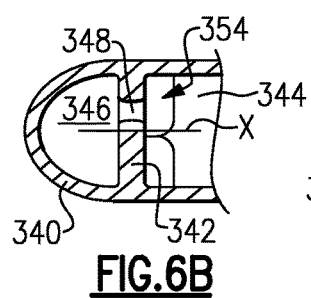
FIG. 6B is a cross-sectional view of the airfoil shown in FIG. 5A taken along the section line shown in FIG. 2.
Figure 6A:
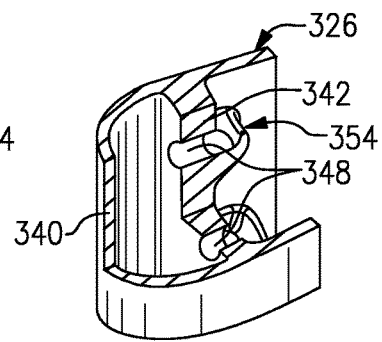
FIG. 6A is a perspective view of another example airfoil.

Referring to the airfoil 326 shown in FIGS. 6A-6C, the impingement holes 348 include an entrance 360 facing the cooling passage 344. The impingement holes 348 extend from the entrance 360 to an exit 362, which faces the impingement cavity 346. The impingement wall 342 includes first and second legs 356, 358 adjoining one another at an angle to provide a scoop 354. The scoop 354 is disposed in the cooling passage 344 and arranged at the entrance 360. The scoop 354 is oriented to receive flow from the cooling passage 344 and directed through the impingement hole 348 onto the leading edge wall 340 with increased velocity. In the orientation illustrated in the Figures, the cooling flow in the cooling passage 344 flows from top to bottom.

Figure 7C:
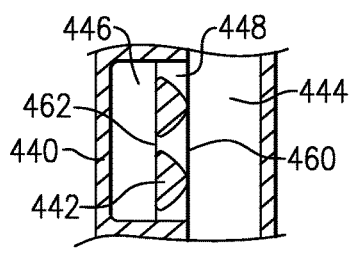
FIG. 7C is a cross-sectional view of the airfoil shown in FIG. 5B taken along line X.
Figure 7B:
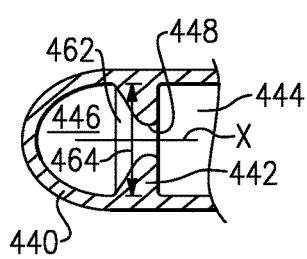
FIG. 7B is a cross-sectional view of the airfoil shown in FIG. 5A taken along the section line shown in FIG. 2.
Figure 7A:
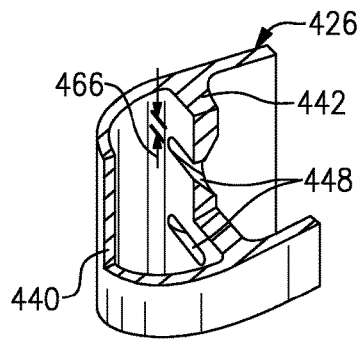
FIG. 7A is a perspective view of another example airfoil.

Referring to the airfoil 426 shown in FIGS. 7A-7C, the impingement holes 448 include an entrance 460 facing the cooling passage 444. Impingement holes 448 extend to the exit 462 and face the impingement cavity 446. In one example, the entrance 460 and exit 462 have different shapes than one another, for example, to create a nozzle effect, as the cooling fluid flows from the cooling passage 444 to the impingement cavity 446 onto the leading edge wall 440. In one example, the entrance 460 is generally circular, and the exit has a width 464 that is substantially greater than a height 466. In the example illustrated in the Figures, the width 464 is oriented in the airfoil thickness direction T. However, it should be understood that the shapes of the entrance 460 and exit 462 as well as the orientation of these features may be configured as desired.

Figure 8:
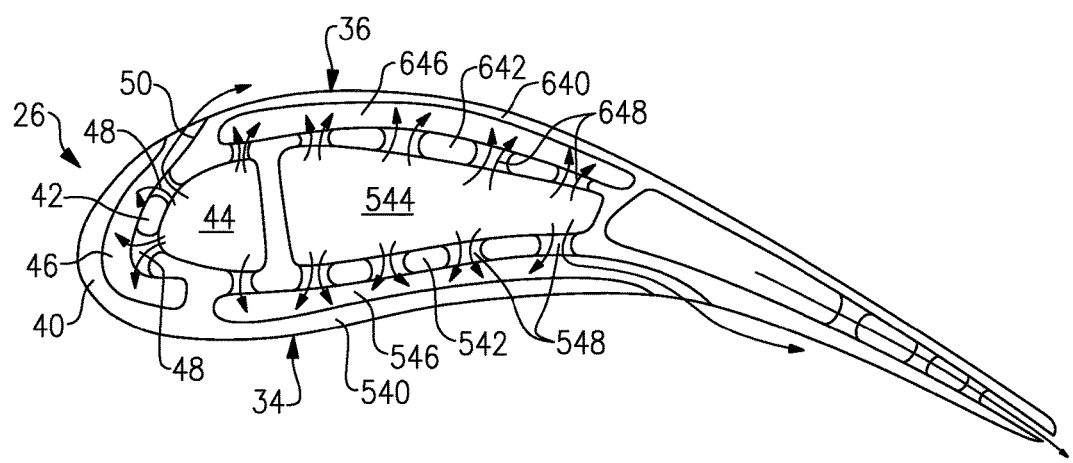
FIG. 8 is a cross-sectional view of another example airfoil.

One example of the airfoil 26 illustrated in FIGS. 3A-3C is shown in more detail in FIG. 8. The example airfoil 26 includes impingement cooling provided on the pressure and suctions sides 34, 36. The pressure side 34 includes an impingement wall 542 having impingement holes 548. The impingement holes 548 provide cooling flow from the cooling passage 544 to the impingement cavity 546 onto the pressure side wall 540. In a similar manner, cooling flow is provided from the cooling passage 544 through impingement holes 648 in the impingement wall 642 to the impingement cavity 646. The cooling flow through the impingement hole 648 is directed onto the suction side wall 640. As illustrated in FIG. 8, impingement cooling can be provided in any desired location of the airfoil 26.

The airfoil geometries disclosed in FIGS. 3A-8 may be difficult to form using conventional casting technologies. Thus, an additive manufacturing process 68 may be used, as schematically illustrated in FIG. 9. Powdered metal 73 suitable for aerospace airfoil applications is fed to a machine 72, which may provide a vacuum, for example. The machine 72 deposits multiple layers of powdered metal onto one another. The layers are joined to one another with reference to CAD data 70, which relates to a particular cross-section of the airfoil 20. In one example, the powdered metal 73 may be melted using a direct metal laser sintering process or an electron-beam melting process. With the layers built upon one another and joined to one another cross-section by cross-section, an airfoil or core with the above-described geometries may be produced, as indicated at 74. The airfoil may be post-processed 76 to provide desired structural characteristics. For example, the airfoil may be heated to reconfigure the joined layers into a single crystalline structure or directionally solidified.

Alternatively, the core may be placed in a wax casting that provides the shape of an airfoil contour and cast conventionally. Similar to the process described above with respect to forming an airfoil, a core may be formed using the CAD data 70, the powdered metal 73, and the machine 72. The core is produced with a first structure corresponding to the cooling passage, a second structure corresponding to an impingement cavity and columns interconnecting the first and second structures, which correspond to the cooling passage and the impingement cavity. The columns correspond to the multiple impingement cooling holes. The first and second structures and the columns are integrally formed by the joined layers.

Although an example embodiment has been disclosed, a worker of ordinary skill in this art would recognize that certain modifications would come within the scope of the claims. For that reason, the following claims should be studied to determine their true scope and content.

What is claimed is:

1. A method of manufacturing an airfoil comprising the steps of:
    depositing multiple layers of powdered metal onto one another;
    joining the layers to one another with reference to CAD data relating to a particular cross-section of an airfoil; and
    producing the airfoil with leading and trailing edges joined by spaced apart pressure and suction sides to provide an exterior airfoil surface, an exterior wall providing the exterior airfoil surface at the leading edge, an impingement wall integrally formed with the exterior wall to provide an impingement cavity between the exterior wall and the impingement wall, and multiple impingement holes provided in the impingement wall, the impingement holes spaced laterally across the impingement wall, wherein the impingement wall includes a surface from which a first leg extends outward, a second leg adjoins the first leg at an angle to provide a scoop arranged in a radially extending cooling passage with the second leg spaced from the surface, the impingement holes include an entrance facing the cooling passage, and an exit facing the impingement cavity, the scoop arranged at the entrance.

2. The method according to claim 1, comprising heating the airfoil to reconfigure the joined layers into a single, crystalline structure.

3. The method according to claim 1, wherein the impingement holes are spaced laterally across the impingement wall along rows extending in a radial direction.

4. The method according to claim 1, wherein the impingement wall includes a generally uniform thickness.

5. The method according to claim 4, wherein the exterior wall is a leading edge wall.

6. The method according to claim 1, wherein the impingement wall includes an arcuate shape in an airfoil thickness direction.

7. The method according to claim 6, wherein the arcuate shape extends toward the leading edge.

8. The method according to claim 6, wherein the arcuate shape extends away from the leading edge.

9. The method according to claim 1, wherein the impingement holes are spaced laterally across the impingement wall along rows extending in a radial direction.

10. The method according to claim 1, wherein the impingement holes include the entrance facing a radially extending cooling passage and extending to the exit facing the impingement cavity, the entrance and exit having different shapes.

11. The method according to claim 10, wherein the entrance is generally circular, and the exit is elongated and has a width that is substantially greater than a height.

12. The method according to claim 11, wherein the width is oriented in a radial direction or at an angle from the radial direction.

13. The method according to claim 1, comprising a film cooling hole in the airfoil exterior surface and fluidly connected to the impingement cavity.

14. The method according to claim 13, wherein the film cooling holes are arranged in gill rows on at least one of a pressure side and a suction side of the exterior wall.

15. The method according to claim 1, wherein the exterior wall is a pressure side wall.

16. A method of manufacturing an airfoil comprising the steps of:
depositing multiple layers of powdered metal onto one another;
joining the layers to one another with reference to CAD data relating to a particular cross-section of an airfoil; and
producing the airfoil with leading and trailing edges joined by spaced apart pressure and suction sides to provide an exterior airfoil surface, an exterior wall providing the exterior airfoil surface at the leading edge, an impingement wall integrally formed with the exterior wall to provide an impingement cavity between the exterior wall and the impingement wall, and multiple impingement holes provided in the impingement wall, the impingement holes spaced laterally across the impingement wall, wherein the impingement wall includes first and second legs adjoining one another at an angle to provide a scoop arranged in a radially extending cooling passage, the impingement holes include an entrance facing the cooling passage, and an exit facing the impingement cavity, the scoop arranged at the entrance.

\* \* \* \* \*